ated Jan. 10, 1956

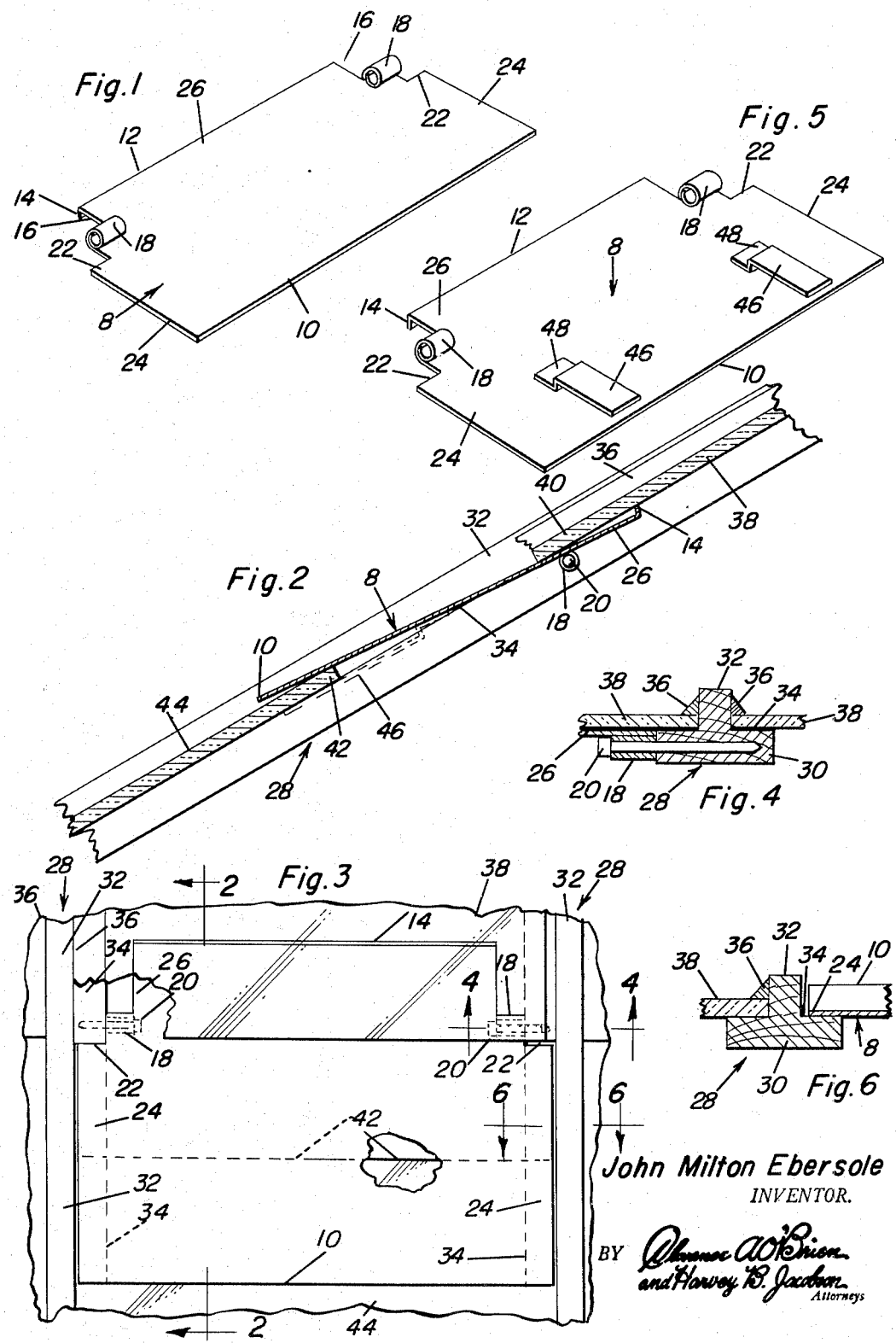

2,730,052
ROOF REPAIR SHEET FOR GREENHOUSES

John Milton Ebersole, Lititz, Pa.

Application June 2, 1953, Serial No. 359,135

6 Claims. (Cl. 108—1)

The present invention relates to a procedure and means whereby an opening in the roof of a greenhouse may be satisfactorily and successfully closed and thus suitably repaired, whereby to protect the interior of the greenhouse against leakage until a permanent repair may be aptly undertaken and completed.

It is a matter of common knowledge that the panes of glass in the commonly constructed roof of a greenhouse often slip down and out-of-place and leave openings ranging from narrow slots to relatively large spaces and this results in damaging consequences to plants and flowers being grown and propagated within the interior of the greenhouse. Inasmuch as it is not always convenient to make permanent repairs by replacing the necessary glass panel or pane, especially during the winter season, makeshift devices and methods are currently resorted to by those who are called upon to keep the roof in acceptable shape. In these circumstances there has long existed a need for a practical repair device. It is therefore the object of the present invention to provide and bring into use a simple, practical and economical device which, as a result of experimental use, has proved to accomplish the result desired.

A brief survey of the disclosure which reveals what is herein achieved has to do with a greenhouse roof structure embodying spaced parallel coplanar inclined frame members, a first pane of glass supported by and between said members, a second pane of glass also supported by and between said members and having one marginal edge spaced from an adjacent marginal edge of said first pane of glass, and a temporary sheet material repair plate spanning said space and protectively covering the same, the upper edge portion of said plate underlying a cooperating lower edge portion of said first pane of glass, the lower edge portion of said plate overlapping the adjacent upper edge portion of said second pane of glass, the other marginal edge portions of the plate cooperating with complemental bordering portions of said frame members and being separably fastened to the latter.

Another object of the invention related to the above has to do with a repair plate which is characterized by attaching eyes from the underside of the plate which eyes are accessible and which serve to accommodate brads or nails which are passed through the respective eyes and driven into the usual wooden frame members whereby when satisfactory weather conditions again prevail the repair plate may be removed and a permanent glass pane substituted therefor under which condition the usual retaining putty may be satisfactorily applied for suitable hardening and retention purposes.

Novelty is also directed to the device as a new article of manufacture and which, as generally stated is characterized by a flat plate cut to size to cover said opening, the upper marginal edge portion of said plate being adapted to underlie one plane of glass and the lower edge portion being adapted to extend upwardly and outwardly by way of the opening in a manner to overlap an edge portion of a second pane of glass, said plate being thus of an area greater than the over-all area of said opening and being provided on its underside with eyes adapted to accommodate brads through the medium of which said plate may be detachably nailed to frame members supporting said panes of glass, wherein said plate is generally rectangular in plan, said eyes being struck out from the plate and coiled to desired shape, said eyes being located in close proximity to said upper marginal edges, the transverse edge portions of the plate projecting outwardly beyond the eyes and defining end flanges which in practice are adapted to cooperate with portions of the stated frame members.

Other objects, features and advantages will become more readily apparent from the following description and the accompanying sheet of drawings.

In the accompanying sheet of drawings wherein like numerals are employed to designate like parts throughout the views:

Figure 1 is a bottom perspective view of the repair plate or device constructed in accordance with the principles of the present invention;

Figure 2 is a fragmentary sectional elevational view showing how the device is installed, said view being taken on the plane of the line 2—2 of Figure 3 looking in the direction of the arrows;

Figure 3 is a fragmentary top plan view of the structure seen in Figure 2;

Figure 4 is a slightly enlarged fragmentary sectional end elevational view taken on the plane of the line 4—4 of Figure 3 looking in the direction of arrows;

Figure 5 is a bottom perspective view of a modification of the repair plate shown at the left in Figure 1; and Fig. 6 is a fragmentary cross-section on the plane of the line 6—6 of Figure 3 looking in the direction of the arrows.

The simple form of the repair device as seen in Figure 1 wherein it will be observed that the same comprises a tin or equivalent sheet material plate. The material should be lightweight and inexpensive and in practice it will vary in size but will be approximately of the shape shown and, as a matter of fact, will usually be hand-cut to fit the particular opening which is to be temporarily covered and thus repaired. The major or main portion of the plate may be said to be rectangular and this portion is denoted by the numeral 8. The lower longitudinal edge thereof is denoted at 10 and the upper parallel longitudinal edge is denoted at 12 and where the metal is relatively thin it is desirable to have a laterally bent reinforcing lip 14. Where the gauge of metal is sufficiently strong in and of itself this lip may be, of course, omitted. Cut-out from the edge portions 16—16 are narrow metal strips which are rolled or coiled as at 18—18 to provide convenient open-ended attaching eyes to accommodate brads or nails 20 as shown best in Figure 4. Clearance notches are also cut as at 22—22 and the projecting transverse marginal edge portions may therefore be described as outstanding flanges 24—24. The edge portion 12 which extends beyond the position of the eyes 18—18 constitutes a relatively narrow extension conveniently designated at 26.

In the roof construction the customary rails or roof members, generally of wood, are approximately T-shaped in cross-section and one of these is denoted at 28 in Figure 4 and comprises a base 30 and an upstanding rib 32. The upper faces of the base provide ledges 34—34 which support the marginal edge portions of the glass window panes and these are held in place, as usual, with putty 36. In the installation shown in Figure 2 and also in Figure 3 the upper inclined glass panel, called the first panel, is denoted by the numeral 38 and the narrow portion 26 of the repair plate underlies the lower edge portion 40 in the manner shown. Where the lip is provided, the lip 14 rests against the underside of the glass pane. This makes it possible to install the device from the inside of the green house as is obvious. All that is necessary is to arrange the respective eyes against the respective marginal edge portions of the roof members 28 and to drive the brads or nails through the eyes and into the frame member in the manner best shown in Figure 4. The rectangular or wider body portion 8 extends upwardly and outwardly through the slot which exists between the lower edge portion 40 of the first pane and the upper edge 42 of the second or lower pane 44. This means that the marginal edge portion 10 of the plate thus overlaps the edge portion 42. It also means that the entire repair plate is cut to a size which is larger than the opening so that the overlapping and underlapping results are possible. It may be necessary to knock some of the putty off which might interfere with the flanges 24—24 taking their proper sealing positions over the edge portions 34—34 of the frame member.

Where larger repair plates are necessary the hold-down clips are provided and these are denoted at 46—46 and attached in place at 48. They are applied as shown in dotted lines in Figure 2.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination, a greenhouse roof structure embodying spaced parallel coplanar inclined frame members, a first pane of glass supported by and between said members, a second pane of plass also supported by and between said members and having one marginal edge spaced from an adjacent marginal edge of said first pane of glass, and a temporary sheet material repair plate spanning said space and protectively covering the same, the upper edge portion of said plate underlying a cooperating lower edge portion of the first pane of glass, the lower edge portion of said plate overlapping the adjacent upper edge portion of said second pane of glass, the other marginal edge portions of the plate cooperating with complemental bordering portions of said frame members and being separably fastened to the latter.

2. In combination, a greenhouse roof structure embodying spaced parallel coplanar inclined frame members, a first pane of glass supported by and between said members, a second pane of glass also supported by and between said members and having one marginal edge spaced from an adjacent marginal edge of said first pane of glass, and a temporary sheet material repair plate spanning said space and protectively covering the same, the upper edge portion of said plate underlying a cooperating lower edge portion of the first pane of glass, the lower edge portion of said plate overlapping the adjacent upper edge portion of said second pane of glass, the other marginal edge portions of the plate cooperating with complemental bordering portions of said frame members and having attaching eyes, and accessible nails passing through the respective eyes and driven into the respective cooperating frame members.

3. The structure defined in claim 2, wherein said lower edge portion of the plate is provided with hook-shaped hold-down clips, the latter releasably engaging the upper edge portion of said second pane of glass.

4. As a new article of manufacture, a temporarily usable repair device for an opening in a glass roof of a greenhouse comprising a flat plate cut to size to cover said opening, said plate being of an area greater than the over-all area of said opening and being provided on its underside with eyes adapted to accommodate brads through the medium of which said plate may be detachably nailed to supporting frame members, said plate being rectangular in plan, said eyes being struck out from the plate and coiled to desired shape, and located in close proximity to an upper lengthwise marginal edge of the plate, the transverse edge portions of the plate projecting outwardly and beyond said eyes and defining end flanges.

5. The structure defined in claim 4 wherein the lengthwise marginal edge portion of the plate projecting beyond said eyes is of a length less than the main body portion and is provided with a lateral reinforcing lip.

6. The structure defined in claim 5 and wherein the lower lengthwise edge portion of the plate is provided with hook-shaped hold-down clips.

No references cited.